United States Patent
Hiraoka et al.

(10) Patent No.: US 11,299,600 B2
(45) Date of Patent: Apr. 12, 2022

(54) METHACRYLIC RESIN COMPOSITION AND USE THEREOF

(71) Applicant: KURARAY CO., LTD., Kurashiki (JP)

(72) Inventors: Nobutaka Hiraoka, Tainai (JP); Toru Abe, Tainai (JP); Taketomo Yamashita, Tainai (JP); Takuro Niimura, Tainai (JP); Atsuhiro Nakahara, Tainai (JP)

(73) Assignee: KURARAY CO., LTD., Kurashiki (JP)

( * ) Notice: Subject to any disclaimer, the term of this patent is extended or adjusted under 35 U.S.C. 154(b) by 194 days.

(21) Appl. No.: 16/488,102

(22) PCT Filed: Feb. 21, 2018

(86) PCT No.: PCT/JP2018/006118
§ 371 (c)(1),
(2) Date: Aug. 22, 2019

(87) PCT Pub. No.: WO2018/155467
PCT Pub. Date: Aug. 30, 2018

(65) Prior Publication Data
US 2020/0377688 A1 Dec. 3, 2020

(30) Foreign Application Priority Data

Feb. 22, 2017 (JP) .............................. JP2017-031493

(51) Int. Cl.
| | |
|---|---|
| *C08K 3/08* | (2006.01) |
| *C08J 5/18* | (2006.01) |
| *C08K 5/13* | (2006.01) |
| *C08L 33/10* | (2006.01) |
| *C08F 220/14* | (2006.01) |
| *C08F 120/14* | (2006.01) |
| *C08F 20/14* | (2006.01) |
| *C08L 33/12* | (2006.01) |

(52) U.S. Cl.
CPC ................ *C08K 3/08* (2013.01); *C08F 20/14* (2013.01); *C08F 120/14* (2013.01); *C08F 220/14* (2013.01); *C08J 5/18* (2013.01); *C08K 5/13* (2013.01); *C08L 33/10* (2013.01); *C08J 2333/10* (2013.01); *C08J 2333/12* (2013.01); *C08J 2433/10* (2013.01); *C08K 2003/0812* (2013.01); *C08K 2003/0818* (2013.01); *C08L 33/12* (2013.01)

(58) Field of Classification Search
CPC .......... C08L 33/10; C08L 33/12; C08F 20/14; C08F 120/14; C08F 220/14; C08K 5/13; C08K 3/08; C08J 5/18
See application file for complete search history.

(56) References Cited

U.S. PATENT DOCUMENTS

| | | | | |
|---|---|---|---|---|
| 2009/0118450 A1* | 5/2009 | Hamada | ................... | C08F 6/02 |
| | | | | 526/329.7 |
| 2015/0166695 A1 | 6/2015 | Konishi et al. | | |
| 2016/0096937 A1 | 4/2016 | Takahashi et al. | | |
| 2017/0313834 A1 | 11/2017 | Hiraoka et al. | | |
| 2018/0305538 A1* | 10/2018 | Murakami | ............. | C08L 33/12 |

FOREIGN PATENT DOCUMENTS

| | | |
|---|---|---|
| JP | 2001-172328 A | 6/2001 |
| JP | 2002-327012 A | 11/2002 |
| JP | 2010-196068 A | 9/2010 |
| JP | WO 2014/002505 A1 | 1/2014 |
| JP | 2014-98117 A | 5/2014 |
| JP | 2016-17129 A | 2/2016 |
| JP | 2016-94534 A | 5/2016 |
| JP | 2016-94550 A | 5/2016 |
| JP | 2016-169282 A | 9/2016 |
| JP | 6148781 B1 * | 6/2017 |
| WO | WO 2014/185508 A1 | 11/2014 |
| WO | WO 2016/076357 A1 | 5/2016 |

OTHER PUBLICATIONS

BASF (Irganox 1076, BASF, Sep. 2010, 2 pages).*
Ciba (Irganox 1010, Ciba, Aug. 1998, 2 pages).*
Google translation of paragraphs 115-119 of JP 6148781 (2017, 2 pages).*
Google patents translation of 6148781 (2017, 19 pages).*
International Search Report dated May 15, 2018 in PCT/JP2018/006118 filed Feb. 21, 2018.

* cited by examiner

*Primary Examiner* — Brieann R Johnston

(74) *Attorney, Agent, or Firm* — Oblon, McClelland, Maier & Neustadt, L.L.P.

(57) ABSTRACT

A methacrylic resin composition comprising 100 parts by mass of a methacrylic resin having an amount of a terminal double bond of less than 0.012% by mole and an amount of a bonded sulfur atom of preferably less than 0.25% by mole; $5\times10^{-6}$ to $9\times10^{-3}$ part by mass of a metal element having an atomic number of not more than 20 (preferably lithium element and aluminum element); and 0.025 to 0.50 part by mass of a hindered phenol antioxidant such as 2,6-bis(1,1-dimethylethyl)-4-methylphenol, wherein the methacrylic resin composition, when being exposed to a nitrogen gas atmosphere at 290° C. for 15 minutes, has a thermogravimetric retention of not less than 98% by mass.

10 Claims, No Drawings

METHACRYLIC RESIN COMPOSITION AND USE THEREOF

TECHNICAL FIELD

The present invention relates to a methacrylic resin composition and use thereof. More particularly, the present invention relates to a methacrylic resin composition which is free from defects caused by an antioxidant and has high heat resistance and high thermal decomposition resistance, and use of the methacrylic resin composition.

BACKGROUND ART

A variety of methacrylic resin compositions intended to improve thermal decomposition resistance have been suggested.

For example, Patent Document 1 discloses a methacrylic resin composition comprising a methacrylic resin comprising not less than 99.5% by mass of a structural unit derived from methyl methacrylate, wherein the methacrylic resin having an amount of a terminal double bond to an amount of the structural unit derived from methyl methacrylate of less than 0.03% by mole and an amount of a bonded sulfur atom to the amount of the structural unit derived from methyl methacrylate of not less than 0.2% by mole; and the methacrylic resin composition has a melt flow rate of not less than 8 g/10 min at 230° C. and a load of 3.8 kg.

Patent Document 2 discloses a methacrylic polymer obtained by polymerization of a monomer mixture comprising 90 to 100% by mass of methyl methacrylate and 0 to 10% by mass of an acrylic acid alkyl ester having 1 to 8 carbon atoms and being copolymerizable with methyl methacrylate, wherein the percentage of a terminal double bond in the polymer is not more than 5%.

Patent Document 3 discloses a polymer composition comprising not less than 1% by mass of a syndiotactic methacrylic acid ester polymer having a proportion of rr triad of not less than 98%, wherein the polymer is obtained by direct polymerization of a monomer comprising a methacrylic acid ester.

Patent Document 4 discloses a resin composition comprising a methacrylic resin (A) having a triad syndiotacticity (rr) of not less than 58%, a content of a structural unit derived from methyl methacrylate of not less than 90% by mass and weight average molecular weight of 30000 to 200000, and an aromatic vinyl copolymer (B) having a content of a structural unit derived from an aromatic vinyl monomer of not less than 20% by mass, wherein a weight average molecular weight of the resin composition is 50000 to 180000 and a content of a component having a molecular weight of less than 15000 is 0.2 to 10% by mass.

Patent Document 5 discloses a thermoplastic resin film comprising a methacrylic resin (A) having a triad syndiotacticity (rr) of not less than 58%, and a weight average molecular weight of 50000 to 150000 wherein a content of a component having a molecular weight of not less than 200000 is 0.1 to 10% and a content of a component having a molecular weight of less than 15000 is 0.2 to 5%, and a vinyl acetal resin (B), wherein a content of the methacrylic resin (A) is 80 to 1 part by mass and a content of the vinyl acetal resin (B) is 20 to 99 parts by mass relative to 100 parts by mass of the total amount of the methacrylic resin (A) and the vinyl acetal resin (B).

A methacrylic resin being free from terminal double bond is usually produced by an anionic polymerization method. In the anionic polymerization method, a metal element such as lithium is used as a polymerization initiator. In order to suppress thermal degradation when a methacrylic resin is subjected to shape forming, hindered phenols or phosphorus antioxidants may be sometimes added.

CITATION LIST

Patent Documents

Patent Document 1: WO 2014/002505 A
Patent Document 2: JP 2001-172328 A
Patent Document 3: JP 2002-327012 A
Patent Document 4: JP 2016-94550 A
Patent Document 5: JP 2016-94534 A
Patent Document 6: JP 2010-196068 A

SUMMARY OF THE INVENTION

Problems to be Solved by the Invention

The methacrylic resin compositions described in the above Patent Documents have still inadequate points in industrial production. For example, the addition of an antioxidant to meet the requirement for thermal decomposition resistance may result in a reduction in transparency, a clogging of a die, or a smudging of a mold. A thin-wall shaped product may cause bleeding out of the antioxidant.

An object of the present invention is to provide a methacrylic resin composition which is free from defects caused by an antioxidant and has high heat resistance and high thermal decomposition resistance, and use of the methacrylic resin composition.

Means for Solving the Problems

The present invention includes the following embodiments.

[1] A methacrylic resin composition comprising 100 parts by mass of a methacrylic resin having an amount of a terminal double bond of less than 0.012% by mole, $5 \times 10^{-6}$ to $9 \times 10^{-3}$ part by mass of a metal element having an atomic number of not more than 20, and 0.025 to 0.50 part by mass of a hindered phenol antioxidant, wherein the methacrylic resin composition, when being exposed to a nitrogen gas atmosphere at 290° C. for 15 minutes, has a thermogravimetric retention of not less than 98% by mass.
[2] The methacrylic resin composition according to [1], wherein the methacrylic resin has an amount of a bonded sulfur atom of less than 0.25% by mole.
[3] The methacrylic resin composition according to [1] or [2], wherein the methacrylic resin has a triad syndiotacticity (rr) of not less than 50%.
[4] The methacrylic resin composition according to any one of [1] to [3], wherein the methacrylic resin has a weight average molecular weight of 50 thousand to 200 thousand.
[5] The methacrylic resin composition according to any one of [1] to [4], wherein the methacrylic resin comprises not less than 99% by mass of a structural unit derived from methyl methacrylate.
[6] A pelletized forming material comprising the methacrylic resin composition according to any one of [1] to [5].
[7] A shaped product comprising the methacrylic resin composition according to any one of [1] to [5].
[8] A film comprising the methacrylic resin composition according to any one of [1] to [5].
[9] The film according to [8], having a thickness of 10 to 50 μm.

[10] The film according to [8] or [9], being uniaxially stretched or biaxially stretched to 1.5 to 8 times in an area ratio.

Advantageous Effects of the Invention

The methacrylic resin composition of the present invention is free from defects caused by an antioxidant and has high heat resistance and high thermal decomposition resistance. A shaped product comprising the methacrylic resin composition of the present invention, for example, a film, is excellent in transparency and excellent in thermal decomposition resistance. In the film of the present invention, strength deterioration due to heat, coloring due to heat, dimensional change due to heat (in a phase difference plate, change of retardation, and the like), the bleed out of additives, and the like hardly occur.

EMBODIMENTS FOR CARRYING OUT THE INVENTION

The methacrylic resin composition of the present invention comprises a methacrylic resin, a metal element having an atomic number of not more than 20, and a hindered phenol antioxidant.

In the methacrylic resin used for the methacrylic resin composition of the present invention, an amount of a terminal double bond is less than 0.012% by mole, and preferably less than 0.011% by mole.

The amount of the terminal double bond of the methacrylic resin is a value $D_p$ determined as follows.

The methacrylic resin is dissolved in deuterated chloroform to obtain a solution having a concentration of 15 to 20% by mass. Relative to the mass of the methacrylic resin, 10% by mass of tris(6,6,7,7,8,8,8-heptafluoro-2,2-dimethyl-3,5-octa nedionate)europium is added to the solution. The resultant solution is subjected to integration measurement by $^1$H-NMR over not less than 12 hours. From the resultant $^1$H-NMR spectrum, the total $X_p$ of the integrated intensity of a signal derived from a terminal double bond (resonance frequency: 5.5 ppm and 6.2 ppm) and the integrated intensity $Y_p$ of a signal derived from a methoxy group of methyl methacrylate in a main chain (resonance frequency: 3.6 ppm) are measured, and the amount Dp of the terminal double bond is calculated by the following formula.

$$D_p=[(X_p/2)/(Y_p/3)]\times 100$$

The amount of the terminal double bond can be controlled by appropriately selecting a polymerization method, used amounts of a polymerization initiator and a chain transfer agent, temperatures at the time of polymerization reaction, as well as duration of polymerization. For example, from the viewpoint of reduction in the amount of the terminal double bond, in radical polymerization, it is preferable that the amount of the polymerization initiator is reduced, the amount of the chain transfer agent is increased, temperature during polymerization reaction is lowered, and duration of the polymerization is increased. Alternatively, in anion polymerization, terminal double bond can also be eliminated by the use of an active proton as a terminator.

An amount of a bonded sulfur atom in the methacrylic resin to be used in the present invention is preferably less than 0.25% by mole, and more preferably less than 0.15% by mole.

The amount of the bonded sulfur atom of the methacrylic resin is a value $S_p$ determined as follows. The methacrylic resin is dissolved in chloroform to obtain a solution. This solution is added to n-hexane to obtain a precipitate. The precipitate is dried at 80° C. for 12 hours under vacuum. Subsequently, an appropriate amount of the obtained dried product is precisely weighed and is set to a sulfur-burning apparatus, then decomposed in a reactor at a temperature of 400° C. The generated gas is allowed to pass through a furnace at a temperature of 900° C., and absorbed with a 0.3% hydrogen peroxide solution. The obtained liquid (decomposed gas aqueous solution) is appropriately diluted with pure water, and the amount of sulfate ion is measured by ion chromatography (ICS-1500, manufactured by Dionex Corporation, column: AS12A). Mass $W_p$ (% by mass) of sulfur atom per mass of the dried product is calculated. Then, by the following formula, the amount $S_p$ (% by mole) of the bonded sulfur atom is calculated.

$$S_p=W_p\times(100/32)$$

An amount of the bonded sulfur atom can be controlled by appropriately selecting a polymerization method, or used amount of sulfur-containing compounds such as a sulfur chain transfer agent or a persulfate polymerization initiator. The bonded sulfur atom is preferably bonded to the terminal of the methacrylic resin in a state of a sulfide group.

In the methacrylic resin to be used in the present invention, the lower limit of the triad syndiotacticity (rr) is 50%, preferably 52%, more preferably 55%, and further preferably 64%. The upper limit of the triad syndiotacticity (rr) in the methacrylic resin to be used in the present invention is not particularly limited, but from the viewpoint of the productivity, the upper limit is preferably 99%, more preferably 85%, further preferably 77%, and further more preferably 75%, and most preferably 74%.

The triad syndiotacticity (rr) (hereinafter, which may simply be referred to as "syndiotacticity (rr)") refers to a percentage where two diads which are linkage of consecutive two structural units in a triad which is linkage of consecutive three structural units are both racemo (referred to as rr). Note herein that the diad which is the linkage of the two structural units in a polymer molecule having the same steric configuration are called meso, and otherwise called racemo, which are referred to as m and r, respectively.

The triad syndiotacticity (rr) (%) can be calculated by measuring a $^1$H-NMR spectrum in deuterated chloroform at 30° C.; measuring a square measure ($A_X$) of a region from 0.6 to 0.95 ppm and a square measure ($A_Y$) of a region from 0.6 to 1.35 ppm in the resulting spectrum, with the spectrum of TMS being taken as 0 ppm; and using them in the formula: ($A_X/A_Y$)×100.

The methacrylic resin to be used in the present invention has a glass transition temperature of preferably not less than 100° C., more preferably not less than 110° C., further preferably not less than 120° C., and particularly preferably not less than 122° C. The upper limit of the glass transition temperature of the methacrylic resin to be used in the present invention is not particularly limited but is preferably 131° C.

The glass transition temperature is the midpoint glass transition temperature determined from a DSC curve. The DSC curve is obtained using a differential scanning calorimeter according to JIS K7121 as follows. A resin to be measured is subjected to conditions of increasing the temperature once to 230° C., cooling to room temperature; and then increasing the temperature again from room temperature to 230° C. at 10° C./min. During the second increasing temperature, differential scanning calorimetry is performed to obtain the DSC curve.

The methacrylic resin to be used in the present invention has a weight average molecular weight Mw of preferably 50 thousand to 200 thousand, more preferably of 55 thousand to 160 thousand, and still preferably 60 thousand to 120 thousand. As the weight average molecular weight Mw of the methacrylic resin becomes larger, the strength of the shaped product tends to become higher. As the weight average molecular weight Mw of the methacrylic resin becomes smaller, the surface smoothness of the shaped product tends to be better.

The weight average molecular weight Mw is a value determined as follows. To HLC-8320 manufactured by Tosoh Corporation equipped with a differential refractive index detector (RI detector), a column comprising two of TSKgel SuperMultipore HZM-M and a SuperHZ4000 manufactured by Tosoh Corporation, which are serially connected to each other, is installed, a temperature of the column is set at 40° C., and tetrahydrofuran as an eluant is allowed to flow at 0.35 ml/min. A solution is obtained by dissolving 4 mg of the methacrylic resin in 5 ml of tetrahydrofuran. Then, 20 µl of the solution is injected to obtain a chromatogram. Standard polystyrenes having a molecular weight of 400 to 5000000 are subjected to measurement under the same conditions as mentioned above to form a calibration curve. Based on the calibration curve, the weight average molecular weight of the methacrylic resin is calculated.

In the methacrylic resin to be used in the present invention, a content of the structural unit derived from methyl methacrylate is preferably not less than 90% by mass, more preferably not less than 95% by mass, still preferably not less than 98% by mass, still more preferably not less than 99% by mass, and most preferably 100% by mass.

The methacrylic resin may comprise at random a structural unit derived from a monomer other than methyl methacrylate. Examples of the monomer other than methyl methacrylate can include vinyl monomers having a single polymerizable carbon-carbon double bond in a molecule thereof, for example, methacrylic acid alkyl ester other than methyl methacrylate, such as ethyl methacrylate or butyl methacrylate; methacrylic acid aryl ester such as phenyl methacrylate; methacrylic acid cycloalkyl ester such as cyclohexyl methacrylate or norbornenyl methacrylate; acrylic acid alkyl ester such as methyl acrylate, ethyl acrylate, propyl acrylate, butyl acrylate or 2-ethylhexyl acrylate; acrylic acid aryl ester such as phenyl acrylate; acrylic acid cycloalkyl ester such as cyclohexyl acrylate, or norbornenyl acrylate; aromatic vinyl compound such as styrene or α-methylstyrene; acrylamide; methacrylamide; acrylonitrile; methacrylonitrile; and the like.

The method for producing the methacrylic resin is not particularly limited, but from the viewpoint of the good heat resistance and good thermal decomposition resistance, an anionic solution polymerization method is preferable.

Methyl (meth)acrylate and the other monomers to be used in producing the methacrylic resin are preferably subjected to sufficient drying process under the atmosphere of inert gas such as nitrogen, argon, or helium in advance, from the viewpoint of facilitating the polymerization reaction. In the drying process, a dehydrating agent or a drying agent such as calcium hydride, a molecular sieve, or active alumina is preferably used.

The solvent to be used in production of a methacrylic resin by anionic solution polymerization is not particularly limited as long as it does not affect the reaction, and examples thereof can include aliphatic hydrocarbon such as pentane, n-hexane, or octane; alicyclic hydrocarbon such as cyclopentane, methyl cyclopentane, cyclohexane, methyl cyclohexane, or ethyl cyclohexane; aromatic hydrocarbon such as benzene, toluene, ethyl benzene, or xylene; ether such as diethyl ether, tetrahydrofuran, 1,4-dioxane, anisole, or diphenyl ether and the like. The solvent may be used alone or in combination of two or more. Among them, from the viewpoint that the solubility of the generated methacrylic resin is high, the solvent is easily recovered and purified, and commingling of the solvent with a waste water does not easily occur, aromatic hydrocarbon is preferable, and toluene or xylene is particularly preferable. It is preferable that the solvent is subjected to purification such as deaeration or dehydration before use, from the viewpoint of facilitating the polymerization reaction.

Examples of the anionic polymerization initiator to be used in production of the methacrylic resin by the anionic solution polymerization can include an organic lithium compound, an organic sodium compound, an organic potassium compound, an organic magnesium compound, and the like. Among them, from the viewpoint that efficiency of polymerization initiation is high or the polymerization reaction is facilitated, an organic lithium compound is preferable. The anionic polymerization initiator can be used alone or in combination of two or more.

Examples of the organic lithium compound can include alkyl lithium or alkyl di-lithium such as methyl lithium, ethyl lithium, n-propyl lithium, isopropyl lithium, n-butyl lithium, s-butyl lithium, isobutyl lithium, t-butyl lithium, n-pentyl lithium, n-hexyl lithium, tetramethylene di-lithium, pentamethylene di-lithium, or hexamethylene di-lithium; aryl lithium and aryl di-lithium such as phenyl lithium, m-tolyl lithium, p-tolyl lithium, xylyl lithium, or lithium naphthalene; aralkyl lithium and aralkyl di-lithium such as benzyl lithium, diphenyl methyllithium, trityl lithium, 1,1-diphenyl-3-methylpentyl lithium, α-methylstyryl lithium, or di-lithium reaction product of diisopropenylbenzene and butyl lithium; lithium amide such as lithium dimethylamide, lithium diethylamide or lithium diisopropylamide; lithium alkoxide such as lithium methoxide, lithium ethoxide, lithium n-propoxide, lithium isopropoxide, lithium n-butoxide, lithium s-butoxide, lithium t-butoxide, lithium pentyl oxide, lithium hexyl oxide, lithium heptyl oxide, or lithium octyl oxide; lithium phenoxide, lithium-4-methylphenoxide, lithium benzyl oxide, lithium-4-methylbenzyl oxide, and the like. Among them, n-butyl lithium, s-butyl lithium, t-butyl lithium, diphenylmethyl lithium, 1,1-diphenyl-3-methylpentyl lithium, or α-methylstyryl lithium are particularly preferred.

As a polymerization initiator in production of a methacrylic resin by an anionic solution polymerization method, used may be a product obtained by anionization of a compound having an easily anionizable site with an anionic polymerization initiator such as an organic lithium compound. Examples of the compound having an easily anionizable site can include a linear or cyclic conjugated diene compound, a vinyl aromatic compound, a (meth)acrylic acid amide, and the like.

As a polymerization initiator in production of a methacrylic resin by an anionic solution polymerization method, used may be a product (which may be referred to as living polymer) obtained by anionization of a polymer having an easily anionizable site with an anionic polymerization initiator such as an organic lithium compound. Examples of the easily anionizable site can include a unit derived from a linear or a cyclic conjugated diene compound, a unit derived from a vinyl aromatic compound, a unit derived from (meth)acrylic acid amide, and the like. Using of the living polymer as the polymerization initiator can produce a graft copolymer. For example, a graft copolymer can be obtained using a product as an polymerization initiator, wherein the product is obtained by reaction of a poly-(p-methyl styrene) dissolved in cyclohexane with s-butyl lithium in the presence of N,N,N',N'-tetramethyl ethylenediamine under inert gas atmosphere to anionize an appropriate amount of a methyl group at a para position in the poly (p-methyl styrene).

A used amount of the anionic polymerization initiator is not particularly limited, but is preferably 0.1 to 100 mmol/l, and more preferably 1 to 10 mmol/l in terms of the concentration in the polymerization reaction liquid.

In production of a methacrylic resin by anionic solution polymerization, it is preferable that the anionic polymerization initiator and the organic aluminum compound are used in combination.

As the organic aluminum compound, a compound represented by the formula (I) (hereinafter, referred to as "Al compound (I)") is preferably used.

$$AlR^3R^4R^5 \quad (I)$$

wherein, in the formula, $R^3$, $R^4$ and $R^5$ each independently represent an optionally substituted alkyl group, an optionally substituted cycloalkyl group, an optionally substituted aryl group, an optionally substituted aralkyl group, an optionally substituted alkoxyl group, an optionally substituted aryloxy group or N,N-disubstituted amino group. $R^4$ and $R^5$ may join together to form an optionally substituted arylenedioxy group.

From the viewpoint that the living anion activity is high, in the Al compound (I), at least one of $R^3$, $R^4$ and $R^5$ is preferably an optionally substituted aryloxy group, and two of $R^3$, $R^4$ and $R^5$ are preferably an optionally substituted aryloxy group. Examples of the optionally substituted aryloxy group can include phenoxy group, 2-methylphenoxy group, 4-methylphenoxy group, 2,6-dimethylphenoxy group, 2,4-di-t-butylphenoxy group, 2,6-di-t-butylphenoxy group, 2,6-di-t-butyl-4-methylphenoxy group, 2,6-di-t-butyl-4-ethylphenoxy group, 2,6-diphenylphenoxy group, 7-methoxy-2-naphthoxy group, and the like. Furthermore, $R^2$ and $R^3$ may join together to form an arylenedioxy group.

Specific examples of the Al compound (I) can include diethyl(2,6-di-t-butyl-4-methylphenoxy)aluminum, diethyl(2,6-di-t-butylphenoxy)aluminum, diisobutyl(2,6-di-t-butyl-4-methylphenoxy)aluminum, diisobutyl(2,6-di-t-butylphenoxy)aluminum, di-n-octyl(2,6-di-t-butyl-4-methylphenoxy)aluminum, di-n-octyl(2,6-di-t-butylphenoxy)aluminum, ethyl bis(2,6-di-t-butyl-4-methylphenoxy)aluminum, ethyl bis(2,6-di-t-butylphenoxy)aluminum, ethyl[2,2'-methylene bis(4-methyl-6-t-butylphenoxy)]aluminum, isobutyl bis(2,6-di-t-butyl-4-methylphenoxy)aluminum, isobutyl bis(2,6-di-t-butylphenoxy)aluminum, isobutyl[2,2'-methylene bis(4-methyl-6-t-butyl phenoxy)] aluminum, n-octyl bis(2,6-di-t-butyl-4-methylphenoxy)aluminum, n-octyl bis(2,6-di-t-butylphenoxy)aluminum, n-octyl[2,2'-methylene bis(4-methyl-6-t-butylphenoxy)] aluminum, methoxy bis(2,6-di-t-butyl-4-methylphenoxy)aluminum, methoxy bis(2,6-di-t-butylphenoxy)aluminum, methoxy[2,2'-methylene bis(4-methyl-6-t-butylphenoxy)]aluminum, ethoxy bis(2,6-di-t-butyl-4-methylphenoxy)aluminum, ethoxy bis(2,6-di-t-butylphenoxy)aluminum, ethoxy[2,2'-methylene bis(4-methyl-6-t-butylphenoxy)]aluminum, isopropoxy bis(2,6-di-t-butyl-4-methylphenoxy)aluminum, isopropoxy bis(2,6-di-t-butylphenoxy)aluminum, isopropoxy[2,2'-methylene bis(4-methyl-6-t-butylphenoxy)]aluminum, t-butoxy bis(2,6-di-t-butyl-4-methylphenoxy)aluminum, t-butoxy bis(2,6-di-t-butylphenoxy)aluminum, t-butoxy 2,2'-methylene bis(4-methyl-6-t-butylphenoxy)]aluminum, tris(2,6-di-t-butyl-4-methylphenoxy)aluminum, tris(2,6-diphenylphenoxy)aluminum, and the like. These may be used alone or in combination of two or more.

A used amount (mol) of the Al compound (I) is not particularly limited. The preferable used amount (mol) of the Al compound (I) is larger than the used amount (mol) of the polymerization initiator, and a molar ratio of the total used amount (mol) of methyl methacrylate and the other monomers relative to a difference between the used amount (mol) of the Al compound (I) and the used amount (mol) of the polymerization initiator is preferably 15 to 80, more preferably 15 to 70, and further preferably 20 to 50, from the point of view that the polymerization speed can be increased, the reaction time can be shortened, deactivation of the polymerization active terminal species during polymerization reaction can be suppressed, and a polymer designed to have an optimum molecular weight and molecular weight distribution according to application can be produced.

Production of a methacrylic resin by the anionic solution polymerization is preferably performed under atmosphere of inert gas such as nitrogen, argon, or helium.

In production of the methacrylic resin by anionic solution polymerization, from the viewpoint that the living property is kept high, and the polymerization is advanced fast, an additive can be added into the reaction system as necessary.

Examples of the additive can include ether such as dimethyl ether, dimethoxyethane, diethoxyethane, or 12-crown-4; an organic nitrogen-containing compound such as triethylamine, N,N,N',N'-tetramethyl ethylenediamine, N,N,N',N'',N''-pentamethyl diethylenetriamine, 1,1,4,7,10,10-hexamethyl triethylenetetramine, pyridine, or 2,2'-dipyridyl; an organic phosphorus compound such as triethylphosphine, triphenylphosphine, or 1,2-bis(diphenylphosphino)ethane; an inorganic salt such as lithium chloride, sodium chloride, or potassium chloride; an alkali metal alkoxide such as lithium(2-methoxy ethoxy) ethoxide, or potassium t-butoxide; a quaternary ammonium salt or a quaternary phosphonium salt such as tetraethylammonium chloride, tetraethylammonium bromide, tetraethyl phosphonium chloride, or tetraethyl phosphonium bromide, and the like. These additives may be used alone or in combination of two or more. Among them, ether or an organic nitrogen-containing compound is preferable. The organic nitrogen-containing compound is preferably used because it can make the polymerization proceed fast while high living property is kept with a small amount of addition, and is excellent in terms of simplification in the solvent recovering process and load reduction in waste water treatment. A used amount of the additive is not particularly limited, and is preferably 0.1 to 100 mmol/l, and more preferably 1 to 10 mmol/l in terms of the concentration in the polymerization reaction solution.

The anionic polymerization reaction is preferably terminated by addition of a polymerization terminator. Examples of the polymerization terminator can include a compound having an active hydrogen, such as water, methanol, acetic acid, or hydrochloric acid. The polymerization terminator may be used alone or in combination of two or more. The polymerization terminator may be used in a state of an aqueous solution or a solution of an organic solvent. A used amount of the polymerization terminator is not particularly limited, but is preferably 1 to 100 molar times the total used amount of the polymerization initiator and the organic aluminum compound.

The metal element having an atomic number of not more than 20, which is contained in the methacrylic resin composition of the present invention, is Li, Be, Na, Mg, Al, K, and/or Ca, and preferably Li and/or Al. The metal element having an atomic number of not more than 20 can be also contained by adding a predetermined organic metal compound when the methacrylic resin composition of the present invention is prepared. Among the added organic metal compounds, an organic lithium compound or an organic aluminum compound is particularly preferable.

For an amount of the metal element having an atomic number of not more than 20 contained in the methacrylic resin composition, the lower limit is $5 \times 10^{-6}$ part by mass (0.05 ppm), preferably $1 \times 10^{-5}$ part by mass (0.1 ppm), more preferably $1 \times 10^{-4}$ part by mass (1 ppm), further preferably $2 \times 10^{-4}$ part by mass (2 ppm), and even further preferably $4 \times 10^{-4}$ part by mass (4 ppm) relative to 100 parts by mass of the methacrylic resin, and the upper limit is $9 \times 10^{-3}$ part by mass (90 ppm), preferably $8 \times 10^{-3}$ part by mass (80 ppm), more preferably $4 \times 10^{-3}$ part by mass (40 ppm), and further preferably $2 \times 10^{-3}$ part by mass (20 ppm) relative to 100 parts by mass of the methacrylic resin.

An amount of Al element in the methacrylic resin composition is preferably $1 \times 10^{-5}$ to $8.9 \times 10^{-3}$ part by mass, more preferably $1.9 \times 10^{-4}$ to $3 \times 10^{-3}$ part by mass, further preferably $3.5 \times 10^{-4}$ to $2.5 \times 10^{-3}$ part by mass relative to 100 parts by mass of the methacrylic resin. An amount of Li element in the methacrylic resin composition is preferably $1 \times 10^{-6}$ to $5 \times 10^{-3}$ part by mass, more preferably $5 \times 10^{-6}$ to $3 \times 10^{-3}$ part by mass, and further preferably $2 \times 10^{-5}$ to $1.5 \times 10^{-3}$ part by mass relative to 100 parts by mass of the methacrylic resin.

The amount of the metal element having an atomic number of not more than 20 in the methacrylic resin composition is a total amount of the metal element having an atomic number of not more than 20 which is originally contained in the methacrylic resin and an amount of the metal element having an atomic number of not more than 20 which is added when the methacrylic resin composition is prepared. The metal element having an atomic number of not more than 20 can improve transparency and thermal decomposition resistance of a shaped product by a synergistic effect with a small amount of the hindered phenol antioxidant.

The amount of the metal element having an atomic number of not more than 20 contained is a value determined as follows.

To 10 ml of sulfuric acid, 0.15 g of the methacrylic resin composition is added, and the resultant mixture is irradiated with microwave at 220° C. for 25 minutes. The resultant product is allowed to cool, and ion exchanged water is added to the liquid to obtain 20 ml of solution. This solution is subjected to quantitative analysis by ICP emission spectroscopy so as to calculate the content.

The amount of the metal element having an atomic number of not more than 20 contained can be adjusted by types or used amounts of monomers, a polymerization initiator, an organic aluminum compound used in combination with a polymerization initiator, a polymerization terminator and the like to be used in producing a methacrylic resin, and the degree of purification performed after the methacrylic resin is produced. The adjustment of the degree of purification is not particularly limited as long as the content of the metal element having an atomic number of not more than 20 determined by quantitative analysis is within the above range.

A hindered phenol antioxidant to be used in the methacrylic resin composition of the present invention is a substance having a phenolic hydroxyl group which receives radicals generated by the reaction with oxygen and is changed into a stable phenoxy radical and conventionally used for preventing a thermoplastic resin from being oxidized.

Preferable examples of the hindered phenol antioxidant can include 2,6-bis (1,1-dimethylethyl)-4-methylphenol (manufactured by Wako Pure Chemical Industries, Ltd.; BHT), 3,5-di-tert-butyl-4-hydroxytoluene, pentaerythrityl-tetrakis[3-(3,5-di-tert-butyl-4-hydr oxyphenyl)propionate] (manufactured by BASF; product name: IRGANOX 1010), octadecyl-3-(3,5-di-tert-butyl-4-hydroxyphenyl)propionate (manufactured by BASF; product name: IRGANOX 1076), and the like. The hindered phenol antioxidant having a molecular weight of 300 or less is particularly preferable because it has a high sublimation property and can reduce roll fouling and the like due to bleed-out.

An amount of the hindered phenol antioxidant contained in the methacrylic resin composition is 0.025 to 0.50 part by mass, preferably 0.028 to 0.18 part by mass, and more preferably 0.03 to 0.15 part by mass relative to 100 parts by mass of the methacrylic resin. When the amount of the hindered phenol antioxidant is within the above range, the effect of suppressing deterioration of the appearance of the shaped product due to bleed-out or the like and the effect of improving the thermal decomposition resistance are well balanced.

The methacrylic resin composition of the present invention may contain an antioxidant other than hindered phenol antioxidant. Examples of the antioxidant other than hindered phenol antioxidant can include a phosphorus antioxidant, a thioether antioxidant, and the like.

The methacrylic resin composition of the present invention may include another additive such as a thermal degradation inhibitor, a light stabilizer, an ultraviolet absorber, a lubricant, a mold releasing agent, a polymer processing aid, an antistatic agent, a flame retardant, a dye and a pigment, a light dispersing agent, an organic coloring agent, a delustering agent, an impact resistance modifier, a fluorescent substance, and the like, as long as the advantageous effects of the present invention are not impaired.

The thermal degradation inhibitor can trap a polymer radical that is generated at high heat in the practical absence of oxygen to prevent thermal degradation of the resin.

As the thermal degradation inhibitor, 2-t-butyl-6-(3'-tert-butyl-5'-methyl-hydroxybenzyl)-4-methylphenyl acrylate (manufactured by Sumitomo Chemical Company, Limited, trade name: SUMILIZER GM), 2,4-di-t-amyl-6-(3',5'-di-tert-amyl-2'-hydroxy-α-methylbenzyl)phenyl acrylate (manufactured by Sumitomo Chemical Company, Limited, trade name: SUMILIZER GS), and the like, are preferable.

The light stabilizer is a compound that is said to have a primary function of trapping a radical generated by light oxidation. Preferable examples of the light stabilizer can include hindered amines such as compounds having a 2,2, 6,6-tetraalkylpiperidine skeleton, and the like.

The ultraviolet absorber is a compound that is said to have a primary function of converting light energy into thermal energy.

Examples of the ultraviolet absorber can include benzophenones, benzotriazoles, triazines, benzoates, salicylates, cyanoacrylates, oxalic anilides, malonic acid esters, formamidines, and the like. These may be used alone or in combination of two or more. Among these, benzotriazoles (compounds having a benzotriazole skeleton) or triazines (compounds having a triazine skeleton) are preferable. Benzotriazoles or triazines are highly effective in suppressing degradation (such as yellowing) of a resin caused by ultraviolet light.

Examples of the benzotriazoles can include 2-(2H-benzotriazol-2-yl)-4-(1,1,3,3-tetramethylbutyl) phenol (manufactured by BASF, trade name: TINUVIN 329), 2-(2H-benzotriazol-2-yl)-4,6-bis(1-methyl-1-phenylethyl)phenol (manufactured by BASF, trade name: TINUVIN 234), 2,2'-methylene bis[6-(2H-benzotriazol-2-yl)-4-tert-octylphenol] (manufactured by ADEKA CORPORATION, LA-31), 2-(5-octylthio-2H-benzotriazol-2-yl)-6-tert-butyl-4-methylphenol, and the like.

Examples of the triazines can include 2,4,6-tris(2-hydroxy-4-hexyloxy-3-methylphenyl)-1,3,5-triazine (manufactured by ADEKA CORPORATION, LA-F70), triazine analogs such as hydroxyphenyltriazine ultraviolet absorbers (manufactured by BASF, for example, CGL 777, TINUVIN 460, and TINUVIN 479), 2,4-diphenyl-6-(2-hydroxy-4-hexyloxyphenyl)-1,3,5-triazine, and the like.

As other than these, ultraviolet absorbers having a maximum molar absorption coefficient, $\varepsilon_{max}$, at a wavelength of 380 to 450 nm of not more than 1200 $dm^3 mol^{-1} cm^{-1}$ can be preferably used. Examples of such ultraviolet absorbers can include 2-ethyl-2'-ethoxy-oxalanilide (manufactured by Clariant Japan K.K., trade name: Sanduvor VSU) and the like.

Examples of the lubricant can include stearic acid, behenic acid, stearamide acid, methylenebisstearamide, hydroxystearate triglyceride, paraffin wax, ketone wax, octyl alcohol, hydrogenated oil, and the like.

The mold releasing agent is a compound having a function of facilitating release of a resin molded product from a mold for shape forming. Examples of the mold releasing agent can include higher alcohols such as cetyl alcohol or stearyl alcohol; glycerin higher fatty acid esters such as stearic acid monoglyceride or stearic acid diglyceride; and the like. In the present invention, it is preferable to use, as the releasing agent, a higher alcohol and a glycerin fatty acid monoester in combination. When the higher alcohol and the glycerin fatty acid monoester are used in combination, a mass ratio of higher alcohol to glycerin fatty acid monoester is preferably 2.5/1 to 3.5/1, and more preferably 2.8/1 to 3.2/1.

Examples of the polymer processing aid can include a polymer particle having a particle diameter of 0.05 to 0.5 µm. The polymer particle can be produced by an emulsion polymerization method. The polymer particle may be a monolayer particle composed of a polymer having a single composition ratio and a single limiting viscosity, or may be a multilayer particle composed of two or more polymers having different composition ratios or different limiting viscosities. Among these, preferable examples thereof can include, particles having a two-layer structure comprising an inner layer being a polymer layer with a relatively low limiting viscosity and an outer layer being a polymer layer with a relatively high limiting viscosity of not less than 5 dl/g. The limiting viscosity of the polymer processing aid is preferably 3 to 6 dl/g.

Examples of the impact resistance modifier can include core-shell modifiers comprising acrylic rubber or diene rubber as a core layer component; modifiers comprising a plurality of rubber particles; and the like.

Preferably used as the organic coloring agent is a compound having a function of converting ultraviolet light, which is thought to be harmful to a resin, into visible light.

Examples of the light dispersing agent and the delustering agent can include glass microparticles, polysiloxane crosslinked fine particles, crosslinked polymer fine particles, talc, calcium carbonate, barium sulfate, and the like.

Examples of the fluorescent substance can include fluorescent pigments, fluorescent dyes, fluorescent white dyes, fluorescent brighteners, fluorescent bleaching agents, and the like.

These additives may be used alone or in combination of two or more. These additives may be added to a polymerization reaction solution during production of the methacrylic resin, or may be added to the methacrylic resin that has been produced, or may be added during preparation of the methacrylic resin composition. From the viewpoint of suppressing defective appearance of the resulting shaped product (in particular, a film) the sum of amounts of the additives contained in the methacrylic resin composition of the present invention is preferably not more than 7 parts by mass, more preferably not more than 5 parts by mass, and further preferably not more than 4 parts by mass relative to 100 parts by mass of the methacrylic resin.

The method for preparing the methacrylic resin composition of the present invention is not particularly limited. Examples of the method can include a method comprising polymerizing a monomer mixture comprising methyl methacrylate in the presence of a compound containing a metal element having an atomic number of not more than 20 to generate a methacrylic resin and then mixing the methacrylic resin with a hindered phenol antioxidant; a method comprising polymerizing a monomer mixture comprising methyl methacrylate in the presence of a compound containing a metal element having an atomic number of not more than 20 and a hindered phenol antioxidant to generate a methacrylic resin; a method comprising molten-kneading a methacrylic resin, an organic metal compound containing a metal element having an atomic number of not more than 20 and a hindered phenol antioxidant; and the like. Other polymers and additives may be mixed as necessary during the molten-kneading; the methacrylic resin may be mixed with other polymers and additives, and then the metal having an atomic number of not more than 20 and a hindered phenol antioxidant may be mixed therewith; the metal having an atomic number of not more than 20 may be mixed with the other polymer and additives, and then the methacrylic resin and the hindered phenol antioxidant may be mixed therewith; the hindered phenol antioxidant may be mixed with the other polymer and additives, and then a methacrylic resin and a metal having an atomic number of not more 20 may be mixed therewith, and another method may be used. Kneading can be performed using a known mixing apparatus or a known kneading apparatus, such as a kneader-ruder, a single screw or twin screw extruder, a mixing roll, or a Banbury mixer. Among these, a twin screw extruder is preferable. The temperature during mixing and kneading can be adjusted appropriately depending on, for example, the melting temperatures of the methacrylic resin to be used, and is preferably 110° C. to 300° C.

The thermogravimetric retention of the methacrylic resin composition of the present invention when being exposed to a nitrogen gas atmosphere at 290° C. for 15 minutes is not less than 98% by mass, more preferably not less than 98.5% by mass, and further preferably not less than 98.7% by mass.

When the thermogravimetric retention is less than 98% by mass, foam is generated at the time of shape forming, and residual monomers in the shaped product are increased, and the heat resistance may be deteriorated.

The thermogravimetric retention of the methacrylic resin composition is a value determined as follows.

A thermogravimetric analyzer (manufactured by Shimadzu Corporation, TGA) is placed in a nitrogen gas atmosphere, and a resin composition to be measured is set, and change of mass of the subject to be measured is recorded under conditions in which dried nitrogen is allowed to flow at a flow rate of 50 ml/min, the temperature is increased from 50° C. to 290° C. at 20° C./min, and then maintained at 290° C. for 20 minutes. The ratio of a mass ($Y_{2c}$) after maintaining 290° C. for 15 minutes relative to a mass ($Y_{1c}$) at 50° C. is a thermogravimetric retention.

Thermogravimetric retention (% by mass)=(($Y_{2c}$)/($Y_{1c}$))×100(% by mass)

It is shown that as the thermogravimetric retention is higher, the thermal decomposition resistance is higher.

The methacrylic resin composition of the present invention, when the thickness is 3.2 mm, has a haze of preferably not more than 3.0%, more preferably not more than 2.0%, and further preferably not more than 1.5%.

For improvement in convenience during storage, transportation or shape forming, the methacrylic resin composition of the present invention may be made into forming material in the shape of pellet, granule, powder or the other.

The methacrylic resin composition of the present invention may be made into a shaped product by a known forming method. Examples of the forming method can include the melt forming methods such as T-die methods (lamination method, coextrusion method, and the like), inflation methods (coextrusion method, and the like), compression forming method, blow forming method, calender forming method, vacuum molding method, injection molding methods (insertion method, two-color method, pressing method, core-back method, sandwich method, and the like); solution casting method; and the like.

For shape forming of the methacrylic resin composition, a mold or a roll can be used. Examples thereof can include a roll for sheet forming, a roll for film forming, a mold for compression forming method, a mold for blow forming method, a calender roll, a mold for vacuum forming method, a mold for injection molding method, a mold for cast polymerization, and the like. The mold or roll may be made of not only metal but also rubber, resin, tempered glass or the like. The methacrylic resin composition of the present invention does not tend to cause mold smudges and thereby can be suitably used in continuous production for a long period of time or in production with many repetitive molding steps.

As applications of the shaped product of the present invention, mentioned can be, for instance, sign board part such as advertising tower, stand-type signboard, side signboard, transom signboard or roof-top signboard; display part such as showcase, divider, or store display; lighting fixture part such as fluorescent lamp cover, mood lighting cover, lampshade, luminous ceiling, luminous wall, or chandelier; interior part such as pendant or mirror; building part such as door, dome, safety window pane, partition, stair skirting board, balcony skirting board, or roof of buildings for recreational use; carrier-related part such as aircraft windshield, pilot visor, motorcycle windshield, motorboat windshield, visor for bus, side visor for automobile, rear visor, head wing, or headlight cover; electronics part such as nameplate for audiovisual, stereo cover, television protection mask, or cover of vending machine display; part of medical equipment such as incubator or X-ray part; part related to instrument such as machinery cover, gauge cover, experimental equipment, rulers dial, or view window; optics-related part such as light guide plate or film for front-light type display, light guide plate or film for back-light type display, protective plate for liquid crystal, Fresnel lens, lenticular lens, or front plate, dispersing plate or reflector of various displays; traffic-related part such as traffic sign, guide plate, traffic mirror, or noise barrier wall; film member such as surface material for automotive interiors, surface material for mobile phones, or marking film; appliance member such as lid material or control panel of washer, or top panel of rice cooker; other items such as greenhouse, large water tank, box-shaped water tank, clock panel, bathtub, sanitary ware, desk mat, gaming part, toy, or face protection mask in welding; and the like.

The shaped product of the present invention is excellent in heat resistance and thermal decomposition resistance, and bleed-out of the antioxidant is suppressed. Therefore, the shaped product of the present invention can be particularly suitable for e.c. various covers, various terminal boards, printed wiring board, or speaker; optical devices such as microscope, binocular, camera, watches or clocks; parts related to video devices, optical recording devices, optical communications devices, or information devices such as viewfinder for camera, VTR or projection TV, filter, prism, Fresnel lens, protective film for substrate of various optical discs (such as VD, CD, DVD, MD, or LD), optical switch, optical connector, liquid crystal display, light guide film or sheet for liquid crystal display, flat-panel display, light guide film or sheet for flat-panel display, plasma display, light guide film or sheet for plasma display, light guide film or sheet for electronic paper, retardation film or sheet, polarizing film or sheet, protective film or sheet for polarizing plates, protective film or sheet for polarizer, wave plate, light dispersing film or sheet, prism film or sheet, reflection film or sheet, anti-reflective film or sheet, viewing-angle-widening film or sheet, anti-glare film or sheet, brightness enhancement film or sheet, display element substrates used in liquid crystal applications or electroluminescence applications, touch panel, light guide film or sheet for touch panel, spacer between various front plates and various modules, or various optical applications.

More specifically, the shaped product of the present invention can also be used in various liquid crystal display elements, electroluminescence display elements, or touch panels, in mobile phones, digital information terminals, pagers, navigation systems, vehicle-mounted liquid crystal displays, liquid crystal monitors, dimming panels, office automation (OA) equipment displays, audio-video (AV) system displays, and the like. From the viewpoint of the excellent weather resistance, the shaped product of the present invention can be particularly suitable for applications in well-known construction material, including building interior or exterior member, curtain wall, roof component, roof material, window member, gutter, exterior member, wall material, flooring, fixture material, road constructing member, retroreflective film or sheet, agricultural film or sheet, lighting cover, advertising sign, light-transmissive noise barrier wall, and the like.

The film of the present invention as one embodiment of the shaped product is not particularly limited in its production process. The film of the present invention can be obtained, for example, by subjecting the methacrylic resin composition to film-forming by a well-known method such as solution casting method, melt-flow casting method, extrusion forming method, inflation forming method, blow forming method, and the like. Among these, extrusion forming method is preferable. Extrusion forming method can give a film having enhanced toughness, excellent ease of handling, and an excellent balance among toughness, surface hardness, and rigidity. The temperature of the methacrylic resin composition discharged from the extruder is set at preferably 160 to 270° C., and more preferably 220 to 260° C.

From the viewpoint of obtaining a film having a high smooth surface, excellent specular gloss, and a low haze, a method comprising extruding the methacrylic resin composition in a molten state through a T-die, and then holding the resultant between two or more mirrored surface rolls or mirrored-surface belts for forming a film is preferable. The mirrored-surface rolls or the mirrored-surface belts are preferably made of metal. The linear pressure between a pair of mirrored-surface rolls or mirrored-surface belts is preferably not less than 2 N/mm, more preferably not less than 10 N/mm, and further more preferably not less than 30 N/mm.

The surface temperatures of the mirrored-surface rolls and the mirrored-surface belts are preferably not more than 130° C. It is preferable that at least one of a pair of mirrored-surface rolls or at least one of a pair of mirrored-surface belts has a surface temperature of not less than 60° C. With the surface temperature being thus adjusted, the methacrylic resin composition when being discharged from the extruder can be cooled faster than when being naturally cooled, thereby allowing the film having a highly smooth and flat surface and a low haze level to be easily produced.

The film of the present invention may be subjected to stretching treatment. The stretching treatment can increase mechanical strength and give a film that does not easily crack. The stretching method is not particularly limited, and examples thereof can include uniaxial stretching method, simultaneous biaxial stretching method, sequential biaxial stretching method, tubular stretching method, and the like. Uniaxial stretching method or biaxial stretching method is preferable. The temperature at the time of stretching is preferably 100° C. to 200° C. and more preferably 120° C. to 160° C. from the viewpoint that uniform stretching can be performed and strength of the resulting film is excellent. Stretching is performed at usually 100 to 5000%/minute in terms of length. It is preferable that the stretching is performed at 1.5 to 8 times in an area ratio. By performing heat setting after stretching, a film having a low level of heat shrinkage can be obtained.

A thickness of the film of the present invention is not particularly limited, but when the film is used as an optical film, the thickness is preferably 1 to 300 μm, more preferably 10 to 50 μm, and further preferably 15 to 40 μm.

The film of the present invention, when the thickness is 40 μm, preferably has a haze of not more than 0.2%, and more preferably not more than 0.1%. Furthermore, the film of the present invention is excellent in surface gloss and transparency. In addition, when the film of the present invention is used for optical member such as protective film for liquid crystal or light guide film, the efficiency of use of a light source is preferably enhanced. Furthermore, the film of the present invention has excellent accuracy in surface formativeness in embossing or the like.

The film of the present invention has excellent transparency and excellent thermal decomposition resistance, has a low likelihood of mold smudges, bleed out, or the like during shape formation at high temperatures and thereby has reduced problems that may be caused by evaporation of the ultraviolet absorber, and can be formed to be thin. Accordingly, the film of the present invention is suitable in such applications as protective film for polarizer, retardation film, protective plate for liquid crystal, surface material for personal digital terminal, protective film for display of personal digital terminal, light guide film, transparent conductive film having a surface coated with silver nanowire or carbon nanotube, front plate of various displays, and the like. In particular, the methacrylic resin composition of the present invention easily produces a shaped product (film) having small birefringent. The film of the present invention having a low phase difference is suitable for a polarizer protective film.

Since the film of the present invention has excellent transparency and excellent thermal decomposition resistance, the film of the present invention can be used in, besides optical applications, IR-cut film, security film, shatter-proof film, decorative film, metallic-decorative film, back sheet for solar cell, front sheet for flexible solar cell, shrink film, in-mold label film, base material film for gas barrier film, and the like.

The film or the sheet of the present invention may comprise a functional layer on at least one side. Examples of the functional layer can include a hard coating layer, an antiglare layer, an anti-reflective layer, an anti-stick layer, a light dispersing layer, an anti-dazzle layer, an anti-static layer, a stain proofing layer, a slippery layer, a gas barrier layer, and the like.

EXAMPLES

The present invention is described more specifically by showing Examples and Comparative Examples. The present invention is not limited to the following Examples. Measurement of physical properties and the like is performed by the following methods.

(Polymerization Conversion)

To a gas chromatograph GC-14A manufactured by Shimadzu Corporation, a column, Inert CAP 1 (df=0.4 μm, 0.25 mm.I.D.×60 m) manufactured by GL Sciences Inc. was attached. Measurement was performed under conditions where the injection temperature was 180° C., the detector temperature was 180° C., and the column temperature was raised from 60° C. (maintained for 5 minutes) to 200° C. at a temperature raising rate of 10° C./minute and then maintained at 200° C. for 10 minutes. Based on results of the measurement, the polymerization conversion was determined by calculation.

[Evaluation of Methacrylic Resin]

(Weight Average Molecular Weight (Mw), Molecular Weight Distribution (Mw/Mn))

A chromatogram was measured by gel permeation chromatography (GPC) under the following conditions, and the results were subjected to calculation to obtain values expressed in terms of a molecular weight of standard polystyrene. The base line was defined as a line connecting a point where the slope is changed from zero to positive on the higher molecular weight side of a peak when viewed from the side of earlier retention time with a point where the slope is changed from negative to zero on the lower molecular weight side of the peak when viewed from the side of earlier retention time.

GPC device: HLC-8320 manufactured by Tosoh Corporation

Detector: Differential refractometer detector

Column: Column obtained by connecting two TSKgel SuperMultipore HZM-M columns and a Super HZ4000 column manufactured by Tosoh Corporation, in series Eluting agent: Tetrahydrofuran Flow rate of eluting agent: 0.35 ml/minute Column temperature: 40° C.

Calibration line: Drawn by connecting 10 data points of standard polystyrene (Triad Syndiotacticity (rr))

A $^1$H-NMR spectrum of a methacrylic resin was measured using a nuclear magnetic resonance spectrometer (manufactured by Bruker, ULTRA SHIELD 400 PLUS), with deuterated chloroform used as a solvent, under conditions at room temperature and integration times of 64. The resulting spectrum was used to determine the square measure (X) of a region from 0.6 to 0.95 ppm and the square measure (Y) of a region from 0.6 to 1.35 ppm with the spectrum of TMS being taken as 0 ppm, followed by calculation of the triad syndiotacticity (rr) by a formula: (X/Y)×100.

(Glass Transition Temperature Tg)

Using a differential scanning calorimeter (manufactured by Shimadzu Corporation, DSC-50 (product number)) and according to JIS K7121, a DSC curve was obtained under conditions of increasing the temperature of a methacrylic resin once to 230° C., cooling to room temperature, and then increasing the temperature again from room temperature to 230° C. at 10° C./minute. The midpoint glass transition temperature found from the DSC curve measured at the second increasing temperature was designated as the glass transition temperature Tg.

(Terminal Double Bond Amount)

A methacrylic resin was dissolved in deuterated chloroform to obtain a solution having a concentration of 15 to 20% by mass. Tris(6,6,7,7,8,8,8-heptafluoro-2,2-dimethyl-3,5-octanedionate)europium was added to the solution at a concentration of 10% by mass relative to the mass of the methacrylic resin. The resulting solution was subjected to integration measurement using NMR (JNM-GX270 manufactured by JEOL Ltd.) over 12 hours. From the resultant $^1$H-NMR spectrum, the total $X_c$ of the integrated intensity of a signal derived from the terminal double bond part (resonance frequency: 5.5 ppm and 6.2 ppm) and the integrated intensity $Y_p$ of a signal derived from a methoxy group in a methyl methacrylate main chain (resonance frequency: 3.6 ppm) were measured, and the terminal double bond amount $D_p$ [% by mole] of the methacrylic resin was calculated by the following formula.

$$D_p=[(3\times X_p)/(2\times Y_p)]\times 100$$

(Amount of Bonded Sulfur Atom)

A methacrylic resin was dissolved in chloroform to obtain a solution, and this solution was added to n-hexane to obtain a precipitate. The obtained precipitate was dried under vacuum at 80° C. for not less than 12 hours. An appropriate amount of the dried product was precisely weighed, and set to a sulfur combustion apparatus and decomposed in a reaction furnace at 400° C., the generated gas was allowed to pass through a 900° C. furnace, and then absorbed by 0.3% hydrogen peroxide solution. The resultant liquid was appropriately diluted with pure water, and sulfuric acid ion was quantified by ion chromatography (ICS-1500 manufactured by DIONEX, column: AS12A). Mass $W_p$ (% by mass) of sulfur atom per mass of the dried product was calculated. Then, the amount $S_p$ of the bonded sulfur atom (% by mole) was calculated by the following formula.

$$S_p=(W_p/32)\times 100$$

[Evaluation of Methacrylic Resin Composition]
(Metal Element Content)

To 0.15 g of the methacrylic resin composition, 10 ml of nitric acid was added. The resultant was irradiated using microwave irradiation apparatus ETHOS-1600 at 220° C. for 25 minutes. After allowing to cool, ion exchanged water was added to the resultant liquid to obtain 20 ml of solution. Quantitative analysis of the metal element for the resultant solution was performed using an ICP luminescent spectroscopic analyzer (Vista Pro manufactured by SII). The content of metal element (part by mass) relative to methacrylic resin 100 parts by mass was calculated.

(Thermogravimetric Retention)

Using a thermogravimetric analyzer (manufactured by Shimadzu Corporation, TGA-50 (product number)), mass change of a methacrylic resin composition was recorded under conditions of increasing the temperature from 50° C. to 290° C. at 20° C./min under a nitrogen atmosphere at a nitrogen flow rate of 50 ml/min, and then maintaining the temperature at 290° C. for 20 minutes under nitrogen atmosphere. On the basis of the mass ($X_{1c}$) at 50° C. (thermogravimetric retention: 100% by mass), based on the mass ($X_{2c}$) when maintaining at 290° C. for 15 minutes, the thermal decomposition resistance was evaluated according to the following formula.

$$\text{Thermogravimetric retention (\% by mass)}=(X_{2c}/X_{1c})\times 100 (\% \text{ by mass})$$

(Total Light Transmittance)

A methacrylic resin composition was subjected to heat press forming to give a shaped product having a thickness of 3.2 mm. The total light transmittance of the shaped product was measured according to JIS K7361-1 with a haze meter (manufactured by Murakami Color Research Laboratory, HM-150).

(Haze)

A methacrylic resin composition was subjected to heat press forming to obtain a shaped product having a thickness of 3.2 mm. The haze of the shaped product was measured according to JIS K7136 using a haze meter (manufactured by Murakami Color Research Laboratory, HM-150).

(Glass Transition Temperature Tg)

With a differential scanning calorimeter (manufactured by Shimadzu Corporation, DSC-50 (product number)) and according to JIS K7121, a DSC curve was obtained under conditions of increasing the temperature of a methacrylic resin composition once to 230° C., cooling to room temperature, and then increasing the temperature again from room temperature to 230° C. at 10° C./minute. The midpoint glass transition temperature found from the DSC curve measured at the second increasing temperature was determined for use as the glass transition temperature.

[Evaluation of Film]
(Roll Smudges)

A methacrylic resin composition was extruded with the use of a film forming apparatus (FS-5 model manufactured by Optical Control System) at a cylinder temperature and a T-die temperature of 290° C., a lip space of 0.5 mm, a discharge rate of 2.7 kg/hr, a roll temperature of 85° C., and a film take-up speed of 2.2 m/minute to obtain a film having a thickness of 100 μm. During the film formation, observation of roll smudges was performed. The observation for roll smudges was performed by visual examination of the surface of a metal roll as the film was being sent forward. Evaluation was performed based on the lapse of time from the start of the forming until the occurrence of white haze on the entire surface of the roll.

A: White haze was not generated for not less than 30 minutes.
B: White haze was generated in less than 30 minutes.

(Production Example 1) (Production of Methacrylic Resin [A-a])

A 5-L glass reaction vessel equipped with a stirring blade and a three-way cock was purged with nitrogen. At room temperature, 1600 g of toluene, 80 g of 1,2-dimethoxyethane, 73.3 g (42.3 mmol) of a 0.45-M solution of isobutyl bis(2,6-di-t-butyl-4-methylphenoxy)aluminum in toluene, and 8.44 g (14.1 mmol) of a 1.3-M solution of sec-butyllithium in a solvent comprising 95% of cyclohexane and 5% of n-hexane were charged in the vessel. Thereto while stirring at 15° C. to 20° C., 550 g of purified methyl methacrylate was added dropwise over 30 minutes. After completion of the dropwise addition, stirring was performed at 15° C. for 90 minutes. The color of the solution turned from yellow to colorless. At this point, the polymerization conversion of methyl methacrylate was 100%.

Next, the following purification was performed so that the amount of Al element was $4\times10^{-4}$ to $1\times10^{-3}$ part by mass and the amount of Li element was $3\times10^{-5}$ to $5\times10^{-4}$ part by mass relative to 100 parts by mass of the methacrylic resin.

Firstly, to the resulting solution, toluene was added for dilution. Then, the diluted solution was poured in a large amount of methanol to obtain a precipitate. The precipitate was removed from the liquid by filtration, and was then washed several times. The resulting precipitate was dried at 80° C. and 140 Pa for 24 hours to obtain a methacrylic resin [A-a] having Mw of 68000, Mw/Mn of 1.06, a syndiotacticity (rr) of 73%, a glass transition temperature of 130° C., and a content of structural unit derived from methyl methacrylate of 100% by mass. In the methacrylic resin [A-a], relative to 100 parts by mass of the methacrylic resin, the amount of Al element was $5\times10^{-4}$ part by mass (5 ppm), and the amount of Li element was $0.5\times10^{-4}$ part by mass (0.5 ppm).

(Production Example 2) (Production of Methacrylic Resin [A-b])

In an autoclave equipped with a stirrer and a sampling tube which had been purged with nitrogen, 100 parts by mass of purified methyl methacrylate, 0.0074 part by mass of 2,2'-azobis(2-methylpropionitrile) (hydrogen abstraction ability: 1%, 1-hour half-life temperature: 83° C.), and 0.28 part by mass of n-octyl mercaptan were added, followed by stirring to give a raw material liquid. In the raw material liquid, nitrogen was introduced for removing oxygen dissolved in the raw material liquid.

From the autoclave, the raw material liquid was fed to the tank reactor to be placed up to ⅔ capacity of the tank reactor. With the temperature maintained at 140° C., a polymerization reaction was initiated in a batch mode. When the conversion reached 55% by mass, the raw material liquid was continuously fed from the autoclave to the tank reactor, while the reaction product solution was discharged from the tank reactor at a flow rate corresponding to the flow rate of the raw material liquid being fed. In this way, the polymerization reaction was switched to a continuous-flow mode for mean residence time of 150 minutes and at a temperature of 140° C. The polymerization conversion in a steady state of the continuous-flow mode was 52% by mass.

The liquid discharged from the tank reactor was fed to a multitubular heat exchanger at an internal temperature of 230° C. at a flow rate such that the mean residence time was 2 minutes, and warmed. The warmed liquid was introduced in a flash evaporator for removal of volatile matter mainly comprising unreacted monomer to obtain a molten resin. The molten resin was fed in a devolatizing twin screw extruder equipped with vent at an internal temperature of 260° C., and was extruded in a form of a strand. The resulting strand was cut with a pelletizer to obtain a methacrylic resin [A-b] having Mw of 82000, Mw/Mn of 1.92, a syndiotacticity (rr) of 51%, a glass transition temperature of 120° C., and a content of structural unit derived from methyl methacrylate of 100% by mass. In the methacrylic resin [A-b], the amount of Al element was 0 part by mass, and the amount of Li element was 0 part by mass relative to 100 parts by mass of the methacrylic resin.

(Production Example 3) (Production of Methacrylic Resin [A-c])

A methacrylic resin [A-c] was produced by mixing and kneading 20 parts by mass of the methacrylic resin [A-a] and 80 parts by mass of the methacrylic resin [A-b], and extruding the resultant product at 260° C. with the use of a twin screw extruder (manufactured by Technovel Corporation, trade name: KZW20TW-45MG-NH-600). In the methacrylic resin [A-c], the amount of Al element was $1\times10^{-4}$ part by mass (1 ppm), and the amount of Li element was $0.1\times10^{-4}$ part by mass (0.1 ppm) relative to 100 parts by mass of the methacrylic resin.

(Production Example 4) (Production of Methacrylic Resin [A-d])

In an autoclave equipped with a stirrer and a sampling tube which had been purged with nitrogen, 97.4 parts by mass of purified methyl methacrylate, 2.6 parts by mass of methyl acrylate, 0.0074 part by mass of 2,2'-azobis(2-methylpropionitrile) (hydrogen abstraction ability: 1%, 1-hour half-life temperature: 83° C.), and 0.28 part by mass of n-octyl mercaptan were added, followed by stirring to give a raw material liquid. In the raw material liquid, nitrogen was introduced for removing oxygen dissolved in the raw material liquid.

From the autoclave, the raw material liquid was fed to the tank reactor to be placed up to ⅔ capacity of the tank reactor. With the temperature maintained at 180° C., a polymerization reaction was initiated in a batch mode. When the polymerization conversion reached 55% by mass, the raw material liquid was fed from the autoclave to the tank reactor, while the liquid was discharged from the tank reactor at a flow rate corresponding to the flow rate of the raw material liquid being fed. Thus, a continuous-flow mode polymerization reaction was performed for mean residence time of 150 minutes at a temperature of 180° C. The polymerization conversion in a steady state of the continuous-flow mode was 55% by mass.

The liquid discharged from the tank reactor was fed in a multitubular heat exchanger at an internal temperature of 230° C. at a flow rate such that the mean residence time was 2 minutes, and warmed. The warmed liquid was charged in a flash evaporation apparatus for removal of volatile matter mainly comprising unreacted monomer to obtain a molten resin. The molten resin was fed into a devolatizing twin screw extruder equipped with vent at an internal temperature of 260° C., and was extruded in the form of a strand. The resulting strand was cut with a pelletizer to obtain a methacrylic resin [A-d] having Mw of 87000, Mw/Mn of 1.78, a syndiotacticity (rr) of 48%, a glass transition temperature of 117° C., and a content of structural unit derived from methyl methacrylate of 98.5% by mass. In the methacrylic resin [A-d], the amount of Al element was 0 part by mass, and the amount of Li element was 0 part by mass relative to 100 parts by mass of the methacrylic resin.

(Production Example 5) (Production of Methacrylic Resin [A-e])

A glass reaction vessel equipped with a stirring blade and a three-way cock was purged with nitrogen. At room temperature, in the vessel, 1600 g of toluene, 80 g of 1,2-dimethoxyethane, 73.3 g (42.3 mmol) of a 0.45-M solution of isobutyl bis(2,6-di-t-butyl-4-methyl phenoxy)aluminum in toluene, and 8.44 g (14.1 mmol) of a 1.3-M solution of sec-butyllithium in a solvent comprising 95% of cyclohexane and 5% of n-hexane were charged. Thereto while stirring at 15° C. to 20° C., 550 g of purified methyl methacrylate was added dropwise to the resultant product over 30 minutes. After completion of the dropwise addition, stirring was performed at 15° C. for 90 minutes. The color of the solution turned from yellow to colorless. At this point, the polymerization conversion of methyl methacrylate was 100%.

The resultant solution was dried at 130° C. and at 140 Pa for 24 hours, and then the resultant product was fed into a devolatizing twin screw extruder equipped with vent at an internal temperature of 260° C. to be extruded in the form of strand. The resulting strand was cut with a pelletizer to obtain a methacrylic resin [A-e] having Mw of 68000, Mw/Mn of 1.06, a syndiotacticity (rr) of 73%, a glass transition temperature of 130° C., and a content of structural unit derived from methyl methacrylate of 100% by mass. In the methacrylic resin [A-e], the amount of Al element was $1000 \times 10^{-4}$ part by mass, and the amount of Li element was $320 \times 10^{-4}$ part by mass relative to 100 parts by mass of the methacrylic resin.

(Production Example 6) (Production of Methacrylic Resin [A-f])

A methacrylic resin [A-f] was produced by mixing and kneading 40 parts by mass of the methacrylic resin [A-a] and 60 parts by mass of the methacrylic resin [A-b], and extruding the resultant product at 260° C. with the use of a twin screw extruder (manufactured by Technovel Corporation, trade name: KZW20TW-45MG-NH-600). In the methacrylic resin [A-f], the amount of Al element was $2 \times 10^{-4}$ part by mass (2 ppm), and the amount of Li element was $0.2 \times 10^{-4}$ part by mass (0.2 ppm) relative to 100 parts by mass of the methacrylic resin.

Physical properties of the methacrylic resins [A-a] to [A-f] are shown in Table 1.

Example 1

A methacrylic resin composition [1] was produced by mixing 100 parts by mass of the methacrylic resin [A-a] and 0.15 part by mass of the hindered phenol antioxidant [C-a], and kneading and extruding the resultant product at 260° C. with the use of a twin screw extruder (manufactured by Technovel Corporation, trade name: KZW20TW-45MG-NH-600).

The methacrylic resin composition [1] was subjected to heat press forming to obtain a platy shaped product having a size of 50 mm×50 mm×3.2 mm. This shaped product was subjected to measurements for total light transmittance, haze, and glass transition temperature. Physical properties of the methacrylic resin composition [1] are shown in Table 2.

The methacrylic resin composition [1] was dried at 80° C. for 12 hours. And the methacrylic resin composition [1] was extruded through a T-die having a width of 150 mm at a resin temperature of 260° C. using a 20-mmΦ single screw extruder (manufactured by OCS), and the resultant product was taken by rolls having a surface temperature of 85° C. to obtain an unstretched film having a width of 110 mm and a thickness of 160 μm. The evaluation results are shown in Table 2.

The unstretched film having a thickness of 160 μm obtained as described above was cut into a small piece of 100 mm×100 mm so that two sides of the small piece were parallel to the direction of extrusion. The small piece was set to a pantograph type biaxial stretching tester (manufactured by Toyo Seiki Seisaku-sho, Ltd.), at a temperature of "glass transition temperature+10° C.", the small piece was stretched twofold in a direction parallel to the direction of extrusion at a stretching speed of 150%/minute, twofold in a direction orthogonal to the direction of extrusion at a stretching speed of 150%/minute, and followed by maintaining it for 10 seconds. Thereafter, the small piece was taken out at room temperature and rapidly cooled down to obtain a biaxially stretched film having a thickness of 40 μm.

TABLE 1

| | Production example | | | | | |
| --- | --- | --- | --- | --- | --- | --- |
| | 1 | 2 | 3 | 4 | 5 | 6 |
| Methacrylic resin | A-a | A-b | A-c | A-d | A-e | A-f |
| terminal double bond amount [% by mole] | 0 | 0.014 | 0.011 | 0.020 | 0 | 0.008 |
| bonded sulfur atom amount [% by mole] | 0 | 0.160 | 0.130 | 0.015 | 0 | 0.100 |
| Syndiotacticity (rr) [%] | 73 | 51 | 56 | 48 | 73 | 60 |
| Tg [° C.] | 130 | 120 | 122 | 117 | 130 | 124 |
| Mw | 68,000 | 82,000 | 78,000 | 87,000 | 68,000 | 73,000 |
| Mw/Mn | 1.06 | 1.92 | 1.52 | 1.78 | 1.06 | 1.50 |
| Content of structural unit from MMA [% by mass] | 100 | 100 | 100 | 98.5 | 100 | 100 |

MMA: methyl methacrylate

Hindered phenol antioxidants [C-a] and [C-b] were prepared.

C-a: 2,6-bis(1,1-dimethylethyl)-4-methylphenol (manufactured by Wako Pure Chemical Industries, Ltd.; BHT)
C-b: pentaerythrityl-tetrakis[3-(3,5-di-tert-butyl-4-hydroxyphenyl)propionate] (manufactured by BASF; product name: IRGANOX 1010)

Examples 2 to 6, Comparative Examples 1 to 6

Methacrylic resin compositions [2] to [12] were produced and evaluated in the same manner as in Example 1 except that blending is performed as shown in Tables 2 and 3. Evaluation results are shown in Tables 2 and 3.

TABLE 2

|  | Ex. 1 | Ex. 2 | Ex. 3 | Ex. 4 | Ex. 5 | Ex. 6 |
|---|---|---|---|---|---|---|
| Methacrylic resin composition | [1] | [2] | [3] | [4] | [5] | [6] |
| Methacrylic resin[parts. by mass] | | | | | | |
| A-a | 100 | 100 | | | 97.5 | |
| A-c | | | 100 | 100 | | |
| A-e | | | | | 2.5 | |
| A-f | | | | | | 100 |
| Metal element[×10$^{-4}$ part. by mass] (itemize) | 5.5 | 5.5 | 1.1 | 1.1 | 39 | 2.2 |
| Al | 5.0 | 5.0 | 1.0 | 1.0 | 30 | 2.0 |
| Li | 0.5 | 0.5 | 0.1 | 0.1 | 9 | 0.2 |
| Hindered phenol antioxidant[part by mass] | | | | | | |
| C-a | 0.15 | 0.05 | 0.03 | 0 | 0.15 | 0.06 |
| C-b | 0 | 0 | 0 | 0.15 | 0 | 0 |
| Physical properties of methacrylic resin | | | | | | |
| terminal double bond amount [% by mole] | 0 | 0 | 0.011 | 0.011 | 0 | 0.08 |
| bonded sulfur atom amount [% by mole] | 0 | 0 | 0.130 | 0.130 | 0 | 0.100 |
| Mw | 68000 | 68000 | 78000 | 78000 | 68000 | 73000 |
| Syndiotacticity (rr) [%] | 73 | 73 | 56 | 56 | 73 | 60 |
| Evaluation results of methacrylic resin composition | | | | | | |
| Thermogravimetric retention [%] | 98.9 | 98.7 | 98.0 | 98.0 | 98.0 | 98.7 |
| Tg [° C.] | 130 | 130 | 122 | 122 | 130 | 124 |
| Total Light Transmittance [%] | 92 | 92 | 92 | 92 | 88 | 92 |
| Haze [%] | 0.2 | 0.2 | 0.2 | 0.2 | 0.3 | 0.2 |
| Evaluation results of unstretched film | | | | | | |
| Thickness [μm] | 160 | 160 | 160 | 160 | 160 | 160 |
| Roll smudges | A | A | A | B | A | A |

TABLE 3

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Methacrylic resin composition | [7] | [8] | [9] | [10] | [11] | [12] |
| Methacrylic resin[parts. by mass] | | | | | | |
| A-a | 100 | | | | 90.5 | |
| A-b | | 100 | 100 | 100 | | |
| A-d | | | | | | 100 |
| A-e | | | | | 9.5 | |
| Metal element[×10$^{-4}$ part by mass] (itemize) | 5.5 | 0 | 0 | 0 | 132 | 0 |
| Al | 5.0 | 0 | 0 | 0 | 100 | 0 |
| Li | 0.5 | 0 | 0 | 0 | 32 | 0 |
| Hindered phenol antioxidant[part by mass] | | | | | | |
| C-a | 0 | 0.05 | 0.15 | 0 | 0.15 | 0.15 |
| C-b | 0 | 0 | 0 | 0.15 | 0 | 0 |
| Physical properties of methacrylic resin | | | | | | |
| terminal double bond amount [% by mole] | 0 | 0.014 | 0.014 | 0.014 | 0 | 0.020 |
| bonded sulfur atom amount [% by mole] | 0 | 0.160 | 0.160 | 0.160 | 0 | 0.015 |
| Mw | 68000 | 82000 | 82000 | 82000 | 68000 | 87000 |
| Syndiotacticity (rr) [%] | 73 | 51 | 51 | 51 | 73 | 48 |
| Evaluation results of methacrylic resin composition | | | | | | |
| Thermogravimetric retention [%] | 64.9 | 90.7 | 96.6 | 96.5 | 98.0 | 95.6 |
| Tg [° C.] | 130 | 120 | 120 | 120 | 130 | 117 |
| Total Light Transmittance [%] | 92 | 92 | 92 | 92 | 82 | 92 |
| Haze [%] | 0.2 | 0.2 | 0.2 | 0.2 | 0.4 | 0.2 |
| Evaluation results of unstretched film | | | | | | |
| Thickness [μm] | 160 | 160 | 160 | 160 | 160 | 160 |
| Roll smudges | A | A | A | B | A | A |

The invention claimed is:

1. A methacrylic resin composition comprising:
   100 parts by mass of a methacrylic resin having an amount of a terminal double bond of less than 0.012% by mole;
   from $1\times10^{-5}$ to $5.0\times10^{-4}$ part by mass of Al element;
   from $1\times10^{-6}$ to $0.5\times10^{-4}$ part by mass of Li element; and
   from 0.025 to 0.50 part by mass of 2,6-bis(1,1-dimethylethyl)-4-methylphenol;
   wherein the methacrylic resin composition, when being exposed to a nitrogen gas atmosphere at 290° C. for 15 minutes, has a thermogravimetric retention of not less than 98% by mass.

2. The methacrylic resin composition according to claim 1,
   wherein the methacrylic resin has an amount of a bonded sulfur atom of less than 0.25% by mole.

3. The methacrylic resin composition according to claim 1, wherein the methacrylic resin has a triad svndiotacticity (rr) of not less than 50%.

4. The methacrylic resin composition according to claim 1,
   wherein the methacrylic resin has a weight average molecular weight of 50 thousand to 200 thousand.

5. The methacrylic resin composition according to claim 1,
   wherein the methacrylic resin comprises not less than 99% by mass of a structural unit derived from methyl methacrylate.

6. A pelletized forming material comprising the methacrylic resin composition according to claim 1.

7. A shaped product comprising the methacrylic resin composition according to claim 1.

8. A film comprising the methacrylic resin composition according to claim 1.

9. The film according to claim 8, having a thickness of 10 to 50 µm.

10. The film according to claim 8, being uniaxially stretched or biaxially stretched to 1.5 to 8 times in an area ratio.

* * * * *